(12) United States Patent
Holness et al.

(10) Patent No.: US 9,203,549 B2
(45) Date of Patent: Dec. 1, 2015

(54) SYSTEMS AND METHODS FOR OPERATIONAL SIMPLIFICATION OF CARRIER ETHERNET NETWORKS

(75) Inventors: Marc Holness, Nepean (CA); Kelly D. Fromm, Newman Lake, WA (US); Cory D. Gordon, Colbert, WA (US)

(73) Assignee: Ciena Corporation, Hanover, MD (US)

( * ) Notice: Subject to any disclaimer, the term of this patent is extended or adjusted under 35 U.S.C. 154(b) by 157 days.

(21) Appl. No.: 13/489,633

(22) Filed: Jun. 6, 2012

(65) Prior Publication Data
US 2013/0329565 A1 Dec. 12, 2013

(51) Int. Cl.
| | |
|---|---|
| *H04L 12/26* | (2006.01) |
| *H04L 12/28* | (2006.01) |
| *G06F 15/16* | (2006.01) |
| *G06F 15/177* | (2006.01) |
| *H04L 1/00* | (2006.01) |
| *H04L 12/701* | (2013.01) |
| *H04L 29/06* | (2006.01) |
| *H04L 12/24* | (2006.01) |

(52) U.S. Cl.
CPC ......... *H04L 1/00* (2013.01); *H04L 43/08* (2013.01); *H04L 43/0811* (2013.01); *H04L 43/10* (2013.01); *H04L 29/06* (2013.01); *H04L 41/0213* (2013.01); *H04L 45/00* (2013.01)

(58) Field of Classification Search
CPC .......... H04L 12/26; H04L 1/00; H04L 43/08; H04L 45/00; H04L 29/06
USPC .......... 370/252, 235, 328, 390, 236.2, 241.1, 370/254, 395.21, 400; 702/182; 709/201, 709/220, 227
See application file for complete search history.

(56) References Cited

U.S. PATENT DOCUMENTS

| | | | |
|---|---|---|---|
| 7,653,056 B1 | 1/2010 | Dianes et al. | |
| 7,653,057 B1 | 1/2010 | Fromm et al. | |
| 7,760,723 B1 | 7/2010 | Daines et al. | |
| 7,830,883 B1 | 11/2010 | Fromm et al. | |
| 7,860,116 B2 | 12/2010 | Tadimeti et al. | |
| 7,869,376 B2 | 1/2011 | Busch et al. | |
| 7,961,632 B2 | 6/2011 | Kondo | |
| 7,961,728 B2 | 6/2011 | Daines et al. | |
| 8,018,938 B1 | 9/2011 | Fromm et al. | |

(Continued)

OTHER PUBLICATIONS

White Paper; Ethernet OAM—A Technical Overview—Juniper Networks; Copyright 2010 Juniper Networks.

(Continued)

*Primary Examiner* — Alpus H Hsu
*Assistant Examiner* — Camquyen Thai
(74) *Attorney, Agent, or Firm* — Clements Bernard PLLC; Christopher L. Bernard; Lawrence A. Baratta, Jr.

(57) ABSTRACT

A Carrier Ethernet method includes receiving a request to initiate an Ethernet Operations, Administration, and Maintenance (OAM) session at a local device, setting up the OAM session at the local device responsive to the request, transmitting a Protocol Data Unit (PDU) from the local device to a remote device with information related to the OAM session and the request contained therein, and receiving the PDU at the remote device and setting up the OAM session at the remote device based on the information in the PDU. The OAM session can include Ethernet Frame Loss Measurement and can be initiated only at the local device without requiring operator involvement at the remote device.

14 Claims, 11 Drawing Sheets

(56) References Cited

U.S. PATENT DOCUMENTS

| | | |
|---|---|---|
| 8,036,106 B1 | 10/2011 | Hu et al. |
| 8,094,559 B1 | 1/2012 | Bly et al. |
| 8,144,574 B1 | 3/2012 | Hu et al. |
| 8,229,705 B1 * | 7/2012 | Mizrahi et al. ................ 702/182 |
| 2005/0068890 A1 | 3/2005 | Ellis et al. |
| 2005/0099949 A1 | 5/2005 | Mohan et al. |
| 2005/0099951 A1 | 5/2005 | Mohan et al. |
| 2005/0099954 A1 | 5/2005 | Mohan et al. |
| 2005/0099955 A1 | 5/2005 | Mohan et al. |
| 2006/0031482 A1 | 2/2006 | Mohan et al. |
| 2008/0291910 A1 | 11/2008 | Tadimeti et al. |
| 2009/0161562 A1 * | 6/2009 | Shah et al. .................... 370/245 |
| 2009/0161566 A1 * | 6/2009 | Sridhar et al. ................ 370/252 |
| 2009/0202239 A1 | 8/2009 | Holness et al. |
| 2009/0232006 A1 * | 9/2009 | Mohan et al. .............. 370/241.1 |
| 2010/0220612 A1 | 9/2010 | Ikematsu et al. |
| 2010/0302949 A1 | 12/2010 | Fukagawa |
| 2011/0158112 A1 * | 6/2011 | Finn et al. .................... 370/252 |
| 2011/0164502 A1 | 7/2011 | Mohan et al. |
| 2012/0250536 A1 * | 10/2012 | Lafleur et al. ................ 370/252 |

OTHER PUBLICATIONS

Paper; Ethernet Service OAM: Overview, Applications, Deployment, and Issues—Fujitsu Network Communications Inc.—2005; us.fujitsu.com/telecom.

International Telephone Connections and Circuits; ITU-T Telecommunication Standardization Sector of ITU—G.8013/Y.1731—OAM functions and mechanisms for Ethernet based networks; Jul. 2011.

* cited by examiner

| 1 | 2 | 3 | 4 |
|---|---|---|---|
| 8 7 6 5 4 3 2 1 | 8 7 6 5 4 3 2 1 | 8 7 6 5 4 3 2 1 | 8 7 6 5 4 3 2 1 |
| MEL | Version (0) | OpCode (LMM=43) | Flags (0) | TLV Offset (32) |
| TxFCf ||||
| Reserved for RxFCf in LMR ||||
| Reserved for TxFCb in LMR ||||
| End TLV (0) ||||

*FIG. 8C*

| 1 | 2 | 3 | 4 |
|---|---|---|---|
| 8 7 6 5 4 3 2 1 | 8 7 6 5 4 3 2 1 | 8 7 6 5 4 3 2 1 | 8 7 6 5 4 3 2 1 |
| MEL | Version (0) | OpCode (LMR=42) | Flags (0) | TLV Offset (32) |
| TxFCf ||||
| RxFCf ||||
| TxFCb ||||
| End TLV (0) ||||

*FIG. 8D*

SYSTEMS AND METHODS FOR OPERATIONAL SIMPLIFICATION OF CARRIER ETHERNET NETWORKS

FIELD OF THE INVENTION

Generally, the field of art of the present disclosure pertains to networking systems and methods, and more particularly, to Carrier Ethernet systems and methods for operational simplification.

BACKGROUND OF THE INVENTION

Carrier Ethernet is evolving to support the needs of the carrier network environment. Carrier Ethernet requires scalable, reliable, and dynamic mechanisms to support operations, administration, and management (OAM) and traffic engineering (TE). Standards have been developed in the Metro Ethernet Forum (MEF), International Telecommunication Union (ITU), Institute of Electrical and Electronics Engineers (IEEE), and the like providing many of these required extensions. Specifically, Connectivity Fault Management (CFM) is an Ethernet standard to provide many common OAM functions associated with underlying network transport for services. For example, CFM is defined in IEEE 802.1ag-2007 IEEE Standard for Local and Metropolitan Area Networks Virtual Bridged Local Area Networks Amendment 5: Connectivity Fault Management, the contents of which are herein incorporated by reference. Also, OAM functions are also defined in ITU-T G.8013/Y.1731 (July 2011) "OAM functions and mechanisms for Ethernet based networks," the contents of which are herein incorporated by reference. Further, the MEF also defines Ethernet OAM in various technical specifications, such as MEF 17 (April 2007) "Service OAM Requirements & Framework," the contents of which are herein incorporated by reference. Variously, CFM enables definition of maintenance domains, their constituent maintenance points, and the managed objects required to create and administer them; definition of relationships between maintenance domains and the services offered by Virtual Local Area Network (VLAN)-aware bridges and provider bridges; description of protocols and procedures used by maintenance points to maintain and diagnose connectivity faults within a maintenance domain; and the like.

Conventionally, in Ethernet Frame Loss Measurement (e.g., Y.1731 ETH-LM), there is a requirement that both a local and remote end of an Ethernet Virtual Circuit (EVC) being monitored collect real-time service data traffic flow metrics at each end. For example, this can include a transmission frame reception counter (TxFCI) counting data frames transmitted toward the peer Maintenance End Point (MEP) and a receiver frame reception counter (RxFCI) counting data frames received from the peer MEP. It may be impractical for device implementations to persistently collect these service traffic flow metrics (i.e., TxFCI and RxFCI counters) associated with all configured EVCs within the network. For example, the device data collection and storage requirements to support this may not be scalable, especially as the number of EVCs within the network increases. To support persistent collection, device implementations require an over abundance of storage (e.g., memory) and processing capacity to be able to actively monitor all EVCs within the Service Provider's network. However, it is rare to have network elements without storage and processing capacity constraints to support persistent capture. Accordingly, support for performance monitoring capability is typically on an "on-demand" basis and/or only for a subset of the EVCs within a Service Provider's network.

With such typical implementations, the Service Provider still needs to perform a management action on both the local and remote peer NE involved in supporting an Ethernet Frame Loss Measurement (ETH-LM) monitored session. As a consequence, a typical device implementation of the ETH-LM protocol may require explicit notification of the EVC to be monitored, so that it can commence collection of the real-time service traffic flow statistics. As a result, when initiating an ETH-LM session, the network operator may need to "touch" (via management actions) both the local and remote device prior to invoking the frame loss measurement. Multiple management actions at the local and remote devices to initiate an ETH-LM session is operationally inefficient and expensive. For example, there may be many EVCs within the network that may require monitoring of Y.1731 ETH-LM, and thus the multiplicative operational expense may be significant.

BRIEF SUMMARY OF THE INVENTION

In an exemplary embodiment, an Ethernet method includes receiving a request to initiate an Ethernet Operations, Administration, and Maintenance (OAM) session at a local device, setting up the OAM session at the local device responsive to the request, transmitting a Protocol Data Unit (PDU) from the local device to a remote device with information related to the OAM session and the request contained therein, and receiving the PDU at the remote device and setting up the OAM session at the remote device based on the information in the PDU. The Ethernet method can further include initiating the OAM session through one of an operator issued command and an application, wherein the OAM session is initiated only at the local device without requiring operator involvement at the remote device. The information related to the OAM session can be located in counter fields in one of a Continuity Check Message (CCM), a Loss Measurement Message (LMM), and Loss Measurement Reply (LMR), and wherein provisioning information for the remote device can be contained in at least one Type-Length-Value (TLV) field of the PDU. The PDU can include a first PDU, and the method can further include collecting remote frame counters for the OAM session at the remote device; and transmitting a second PDU from the remote device to the local device with data related to the remote frame counters contained therein. The Ethernet method can further include receiving the second PDU at the local device; and performing a computation for the OAM session based on the data related to the remote frame counters contained. The provisioning information related to the OAM session can be located in at least one Type-Length-Value (TLV) field of the first PDU and the data related to the remote frame counters is located in counter fields of the second PDU.

The Ethernet method can further include transmitting PDUs between the local device and the remote device; collecting remote frame counters for the OAM session at the remote device; and exchanging information between the local device and the remote device in Type-Length-Value (TLV) fields of the PDUs for setting up a measurement associated with the OAM session. The Ethernet method can further include upon termination of the OAM session, stopping the collecting remote frame counters at the remote device and stopping collecting local frame counters at the local device. The Ethernet method can further include terminating the OAM session at the local device based on session parameters provided during the initiating; and terminating the OAM session at the remote device based on non-reception of PDUs associated with the OAM session during a time window. The Ethernet method can further include collecting frame counters at each of the local device and the remote device only while the OAM session is active; exchanging information including the frame counters between the local device and the remote device in counter fields in one of a Continuity Check Message (CCM), a Loss Measurement Message (LMM), and Loss Measurement Reply (LMR); and exchanging provisioning information related to duration, frequency, and configuration data in at least one Type-Length-Value (TLV) field of the PDU.

The Ethernet method can further include discarding the first measurement at the remote device by the remote device not responding to a first PDU can include Ethernet Frame Loss Measurement. Optionally, the Ethernet Frame Loss Measurement is single-ended, wherein the PDU includes a Loss Measurement Message (LMM) with local frame counter data contained therein, and the method can further include receiving the LMM at the remote node and programming an Ethernet Frame Loss Measurement engine to commence collection of per frame counters from the local node; composing an Loss Measurement Reply (LMR) to the local node and providing data from the collection in the LMR; receiving the LMR at the local node and computing frame loss based on the data from the collection in the LMR. Alternatively, the Ethernet Frame Loss Measurement is dual-ended, wherein the PDU includes a first Continuity Check Message (CCM) with local frame counter data contained therein, and the method can further include receiving the first CCM at the remote node and programming an Ethernet Frame Loss Measurement engine to commence collection of per frame counters from the local node; composing a second CCM to the local node and providing data from the collection in the second CCM; receiving the second CCM at the local node and computing frame loss based on the data from the collection in the second CCM. The Ethernet method can further include utilizing at least one Type-Length-Value (TLV) field of the PDU to exchange data between the local device and the remote device for any Connectivity Fault Management service that requires setup at both the local device and the remote device thereby avoiding the setup at the remote device.

In another exemplary embodiment, an Ethernet node includes at least one port communicatively coupled to a remote device; a processing entity associated with an Ethernet connection on the at least one port, wherein the processing entity includes instructions that, when executed, cause the processing entity to: initiate an Ethernet Frame Loss Measurement session at the Ethernet node; set up the Ethernet Frame Loss Measurement session through collecting local frame counters; transmit a Protocol Data Unit (PDU) to the remote device with information related to the Ethernet Frame Loss Measurement session contained therein; receive a response PDU from the remote device with information related to the Ethernet Frame Loss Measurement session at the remote device contained therein; and calculate Ethernet Frame Loss based on the response PDU. The Ethernet Frame Loss Measurement session can be initiated through one of an operator issued command and an application, wherein the Ethernet Frame Loss Measurement session is initiated only at the Ethernet node without requiring operator involvement at the remote device. The PDU and the response PDU can utilize at least one Type-Length-Value (TLV) field to exchange provisioning information between the Ethernet node and the remote device for any Connectivity Fault Management service that requires setup at both the local device and the remote device thereby avoiding the setup at the remote device.

In yet another exemplary embodiment, an network includes a plurality of interconnected nodes; a local processing entity at a local node of the plurality of interconnected nodes, wherein the local processing entity includes instructions that, when executed, cause the local processing entity to: initiate an Frame Loss Measurement session at the local node; set up the Frame Loss Measurement session through collecting local frame counters; transmit a Protocol Data Unit (PDU) to a remote node with information related to the Frame Loss Measurement session contained therein; receive a response PDU from the remote node with information related to the Frame Loss Measurement session at the remote note contained therein; and calculate Frame Loss based on the response PDU; and a remote processing entity at the remote node of the plurality of interconnected nodes, wherein remote local processing entity includes instructions that, when executed, cause the remote processing entity to: receive the PDU and set up the Frame Loss Measurement session through collecting remote frame counters; and transmit the response PDU with the information related to the Frame Loss Measurement session at the remote note based on the remote frame counters. The Frame Loss Measurement can include one of an Ethernet Frame Loss Measurement and a Multiprotocol Label Switching-Transport Profile Frame Loss Measurement

BRIEF DESCRIPTION OF THE DRAWING(S)

Exemplary and non-limiting embodiments of the present disclosure are illustrated and described herein with reference to various drawings, in which like reference numbers denote like method steps and/or system components, respectively, and in which:

FIGS. 8A-8D are a block diagram of Ethernet OAM Protocol Data Units (PDUs) including a general PDU (FIG. 8A), a CCM (FIG. 8B), an LMM (FIG. 8C), and an LMR (FIG. 8D)

DETAILED DESCRIPTION OF THE INVENTION

In various exemplary embodiments, the present disclosure relates to Carrier Ethernet systems and methods for operational simplification. The systems and methods provide a mechanism where collection and processing of ETH-LM counters (on a network element (NE)) are triggered based upon the ETH-LM protocol itself (as opposed to direct operator management action). Advantageously, the systems and methods allow NEs to conserve/minimize/optimize storage and processing demands in supporting the ETH-LM protocol as well as reducing operational touch points in provisioning ETH-LMs. Further, the systems and methods maintain the integrity of the frame loss measurements, while retaining operational savings (to the Service Provider) and minimizing capital costs. In an exemplary embodiment, a remote device is automatically engaged into participating in an ETH-LM session by the protocol itself (as opposed to requiring operator management action at both local and remote/peer devices). For example, ETH-LM counter collection and storage can be triggered by operator action at a local device. Alternatively, ETH-LM counter collection and storage can be triggered by the ETH-LM protocol (thus not requiring operator management actions). ETH-LM counter collection and storage at the remote/peer device is only performed when the EVC is being actively monitored, and not persistently done over the life of the configured EVC in the network. Once an ETH-LM session is completed/deactivated, the ETH-LM collection and storage performed at the local/remote devices is terminated, thus allowing per device storage and performance resources to be placed in a "free pool" for usage of other operations. Further, a mechanism is provided to ensure an orderly startup of the ETH-LM counters (at the remote device), to ensure the integrity of the frame loss measurements.

Figure 1:
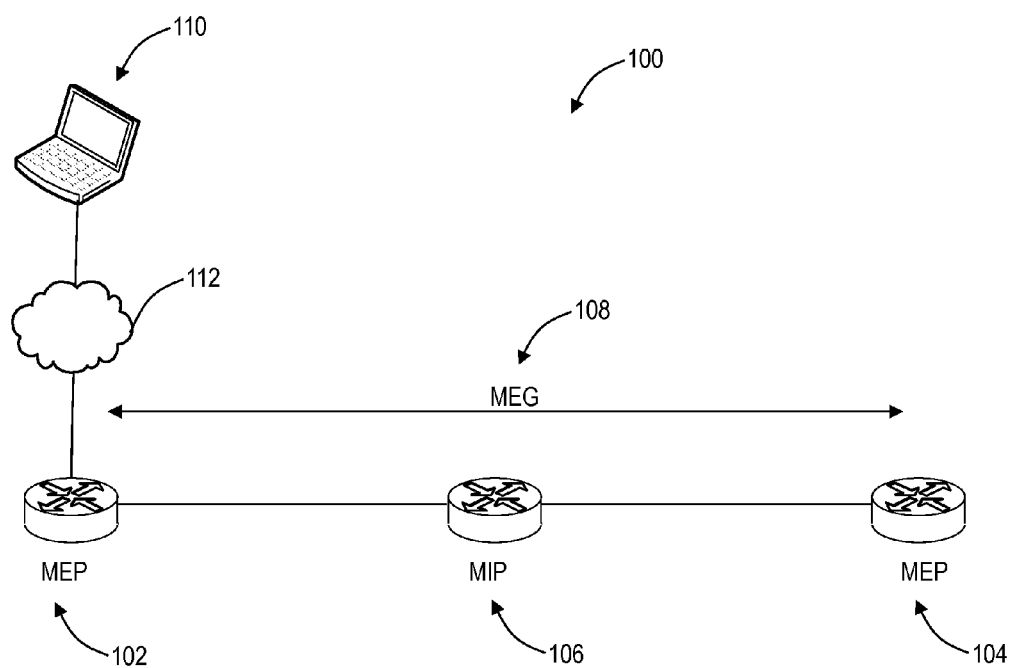
FIG. 1 is a network diagram of an exemplary Carrier Ethernet network configured with Ethernet Operations, Administration, and Maintenance (OAM) mechanisms.

Referring to FIG. 1, in an exemplary embodiment, a network diagram illustrates an exemplary Carrier Ethernet network 100 configured with Ethernet OAM mechanisms. For illustration purposes, the Carrier Ethernet network 100 includes three interconnected network elements 102, 104, 106. The network 100 includes Carrier Ethernet OAM mechanisms such as IEEE 802.1ag CFM, Y.1731, etc. Fundamental to CFM is the concept of a Maintenance Entity Group (MEG) or a Maintenance Association (MA), which is the identified network transport construct spanning the various network nodes underlying a given service or set of services. CFM relies on well defined messages exchanged between the network elements, specifically and in particular each End Point (MEP) that provides origination and termination of the service transport path(s) for a MEG. The network elements 102, 104 are defined as a MEG End Point (MEP). In CFM, a MEP is configured to source and sink CFM frames, i.e. source and sink within a single configured MD (Maintenance Domain), pass-thru if MD Level is higher than the configured level for the MEP, and discard if MD Level is lower. The MEPs 102, 104 are also configured to participate in performance monitoring such as ETH-LM. In a point-to-point network, there are two MEP nodes at the endpoints, and in other configurations, there may be multiple MEP nodes. Also, a CFM domain having one or more Maintenance Intermediate Point (MIP) nodes that may be bounded by a plurality of MEP nodes. In order that CFM frame flows are appropriately filtered so that they are processed only by the intended domain's nodes, the MEP/MIP population of an Ethernet CFM network is configured appropriately.

The network element 106 is defined as a MIP which resides between MEPs, i.e. the MIP 106 is communicatively coupled between the MEPs 102, 104. A MIP is configured to process and forward CFM frames, but does not initiate CFM frames. Although a MIP does not initiate protocol transactions, it does transmit Loopback Reply (LBR) and Linktrace Reply (LTR) messages in response to received Loopback Message (LBM) and Linktrace Message (LTM) messages respectively. As described herein, MEP and MIP terminology is used for nodes present at endpoints and intermediate points, respectively, in the Ethernet network 100. Also, Ethernet Path terminology is used to denote a point-to-point Ethernet connection between two nodes, e.g. the connection being built using Virtual Local Area Network (VLAN) cross connection or unicast Ethernet Media Access Control (MAC) plus VLAN connection. Additionally, other types of Ethernet paths, such as, for example, Provider Backbone Bridging-Traffic Engineering (PBB-TE), MPLS-TP, and the like are also contemplated by the Carrier Ethernet systems and methods described herein.

The Carrier Ethernet systems and methods contemplate implementation and operation on Carrier Ethernet networks such as those compliant to IEEE 802.1ag-2007, G.8013/ Y.1731, and/or MEF. Of note, IEEE 802.1ag-2007 and G.8013/Y.1731 both relate to and define CFM for Ethernet OAM. Various terminology utilized herein, such as MEP, MIP, CCM, PDU, etc. is common to each of IEEE 802.1ag-2007, G.8013/Y.1731, MEF, etc. IEEE 802.1ag-2007 utilizes the term Maintenance Association (MA) whereas G.8013/ Y.1731 utilizes Maintenance Entity Group (MEG) for the same construct. Those of ordinary skill in the art will recognize while described herein as the MEG 108, the MEG 108 could also be referred to as the MA 108. Generally, the MEG 108 and MA relate to an administrative grouping relative to the MEPs 102, 104. Additionally, IEEE 802.1ag-2007 defines a MEP as a Maintenance association End Point whereas G.8013/Y.1731 and MEF define a MEP as a Maintenance Entity Group End Point. In the following description, MEP may be generally referred to as a Maintenance End Point covering both the constructs of IEEE 802.1ag-2007, G.8013/ Y.1731, MEF.

The network elements 102, 104, 106 are configured in a MEG 108 which enable a grouping of nodes in a maintenance group for OAM to be grouped on different spans. The MEG 108 (or an MA 108) is a set of MEPs, each configured with a same unique MEG ID code (UMC) and MEG Level or Maintenance Association Identifier (MAID) and Maintenance Domain (MD) level. The MEG 108 may be thought of as a full mesh a Maintenance Entities (MEs), the MEs including MEPs, MIPs, etc., with a set of MEPs configured therebetween. The UMC is a unique identifier for the MEG 108 domain. Additionally, the MEG 108 allows for nesting of various groups. The MEG Level and the MD is a management space on a network, typically owned and operated by a single entity. MEG Levels and MDs may be configured with names and levels, where the eight levels range from 0 to 7. A hierarchal relationship exists between domains based on levels. The larger the domain, the higher the level value. In case MEGs are nested, the OAM flow of each MEG has to be clearly identifiable and separable from the OAM flows of the other MEGs. In cases the OAM flows are not distinguishable by the ETH layer encapsulation itself, the MEG Level in the OAM frame distinguishes between the OAM flows of nested MEGs. Eight MEG Levels are available to accommodate different network deployment scenarios. As described herein, the various Carrier Ethernet systems and methods may be applied to per-node MEPs, per-interface MEPs, or per-port MEPs. Specifically, a per-node MEP applies to an entire network element whereas per-interface and per-port MEPs are for a single provisioned service on the network element.

The network 100 also includes a management system 110 communicatively coupled to the network elements 102, 104, 106 through a data communications network 112. The management system 110 can be a network management system (NMS), an element management system (EMS), a craft interface, etc. In an exemplary embodiment, the management system 110 is configured to provide OAM access to the network 100 as well as provisioning of services and the like. As described herein, conventional performance monitoring aspects of the network 100 require large amount of data storage and processing capabilities as well as requiring provisioning at both network elements for a service. For example, to provision an ETH-LM measurement between the network elements 102, 104, a user has to perform functions, via the management system 110, at both of the network elements 102, 104. This can be referred to as "operational touch points." The systems and methods presented herein provide operational simplification of performance monitoring tasks in the network 100 reducing data storage, processing capabilities, and operational touch points.

Y.1731 specifies OAM functions for performance monitoring of Ethernet networks enabling operators to meet strict Service Layer Agreements (SLAs). This can include, for example, ETH-LM, frame delay and frame delay variation measurement function (ETH-DM), and the like. In Y.1731, OAM functions for performance monitoring allow measurement of three parameters—frame loss ratio, frame delay, and frame delay variation. These performance parameters apply to service frames, which conform to an agreed-upon level of bandwidth profile conformance. The ETH-LM function is used to calculate frame loss ratio of a connection such as between the network elements 102, 104. This ratio is the number of service frames not delivered, divided by the total number of service frames during a time interval. This calculation is performed by maintaining counters of received and transmitted service frames between the network elements 102, 104. The number of service frames not delivered is the difference between the number of service frames arriving at the ingress Ethernet flow point and the number of service frames delivered at the egress Ethernet flow point in a point-to-point Ethernet connection.

The ETH-LM can be performed as dual-ended and single-ended. In dual-ended, each MEP proactively sends periodic Continuity Check Message (CCM) frames to its peer MEP. Each peer MEP terminates the CCM frames and performs near-end and far-end loss measurements using local counters and counter values in the received CCM frames. In single-ended, a MEP sends a LM request (Loss Measurement Message (LMM)) frames to its peer MEP upon an on-demand administrative trigger. The peer MEP responds with LM reply (LMR) frames. Using counter values in LMR frames and its local counter value, a MEP performs near-end and far-end loss measurements.

For calculating ETH-LM, RxFCl is the value of the local counter for in-profile data frames received from the peer MEP, TxFCl is the value of the local counter for in-profile data frames transmitted toward the peer MEP, $t_c$ is the reception time of the current frame, and $t_p$ is the reception time of the previous frame. The dual-ended frame loss formulas are as follows:

Frame loss far-end=$|TxFCb[t_c]-TxFCb[t_y]|-|RxFCb[t_c]-RxFCb[t_p]|$

Frame loss near-end=$|TxFCf[t_c]-TxFCf[t_p]|-|RxFCl[t_c]-RxFCl[t_p]|$

Where TxFCf is the value of the local counter TxFCl at the time of transmission of the CCM frame, RxFCb is the value of the local counter RxFCl at the time of reception of the last CCM frame from the peer MEP, and TxFCb is the value of TxFCf in the last received CCM frame from the peer MEP.

The single-ended frame loss formulas are as follows:

Frame loss far-end=$|TxFCf[t_c]-TxFCf[t_p]|-|RxFCf[t_c]-RxFCf[t_p]|$

Frame loss near-end=$|TxFCb[t_c]-TxFCb[t_p]|-|RxFCl[t_c]-RxFCl[t_p]|$

Where TxFCf is the value of the local counter TxFCl at the time of LMM frame transmission, RxFCf is the value of local counter RxFCl at the time of LMM frame reception, and TxFCb is the value of local counter TxFCl at the time of LMR frame transmission.

The network elements 102, 104 can also perform frame delay and frame delay variation measurement functions (ETH-DM) by periodically sends frames with ETH-DM information to its peer MEP. A MEP receives frames with ETH-DM information from its peer MEP. MEPs can use one of two methods to perform ETH-DM, one-way ETH-DM or two-way ETH-DM. For one-way ETH-DM to work properly, peer MEPs must have synchronized clocks. The sending MEP sends Delay Measurement (DM) frames including timestamp at transmission time. The receiving MEP calculates the frame delay using the timestamp at the reception of the DM frame and the timestamp in the DM frame. For one-way frame delay variation measurement, clock synchronization on the peer MEPs is not required. The out-of-phase period can be removed by the difference of subsequent frame delay variation measurements. If clocks on peer MEPs are not synchronized, a MEP can measure frame delay using two-way ETH-DM. When two-way DM is enabled, a MEP sends ETH-DM request (Delay Measurement Message (DMM)) frames including timestamp at transmission time. The receiving MEP copies the timestamp into ETH-DM Reply (DMR) and sends that DMR back to the sending MEP. The sending MEP receives the DMR and calculates the two-way frame delay using the timestamp in the DMR and the timestamp at reception of the DMR. Frame delay variation measurement is done by calculating the difference between two subsequent two-way frame delay measurements.

A formula for a One-Way DM Calculation is Frame Delay=RxTime−TxTimeStamp where RxTime is the time at reception of the DM frame and TxTimeStamp is the timestamp at the transmission time of the DM frame. A formula for a Two-Way DM Calculation is Frame Delay=(RxTimeb−TxTimeStampf)−(TxTimeStampb−RxTimeStampf) where RxTimeb is the time at reception of the DMR frame, TxTimeStampf is the timestamp at the transmission time of the DMM frame, TxTimeStampb is the timestamp at the transmission of the DMR frame, and RxTimeStampf is the timestamp at the reception of the DMM frame. To perform throughput measurement, a MEP sends unicast loopback or test frames at increasing rate until frames start getting dropped. The rate at which the frames start getting dropped is reported. Frame size is configurable. The throughput measurement can be one-way or two-way.

In various exemplary embodiments, the systems and methods described herein provide operational simplifications to OAM provisioning and collection in the network 100. For example, the OAM can relate to ETH-LM, ETH-DM, etc. In the foregoing description, the systems and methods are described with reference to ETH-LM for illustration purposes. The systems and methods are configured to automatically engage a remote device into participating in an ETH-LM session by the protocol itself. This is in lieu of having an extra touch point at the remote device where a user is required to perform a management action. The ETH-LM counter collection and storage is triggered by operator action at the local device such as through the management system 110 or the like. At the remote device, ETH-LM counter collection and storage is triggered by the ETH-LM protocol (thus not requiring operator management actions). The systems and methods also only collect and store counters when an ETH-LM session is active, i.e. collection and storage of counters is not persistently done over the life of the configured EVC in the network 100.

Figure 2:
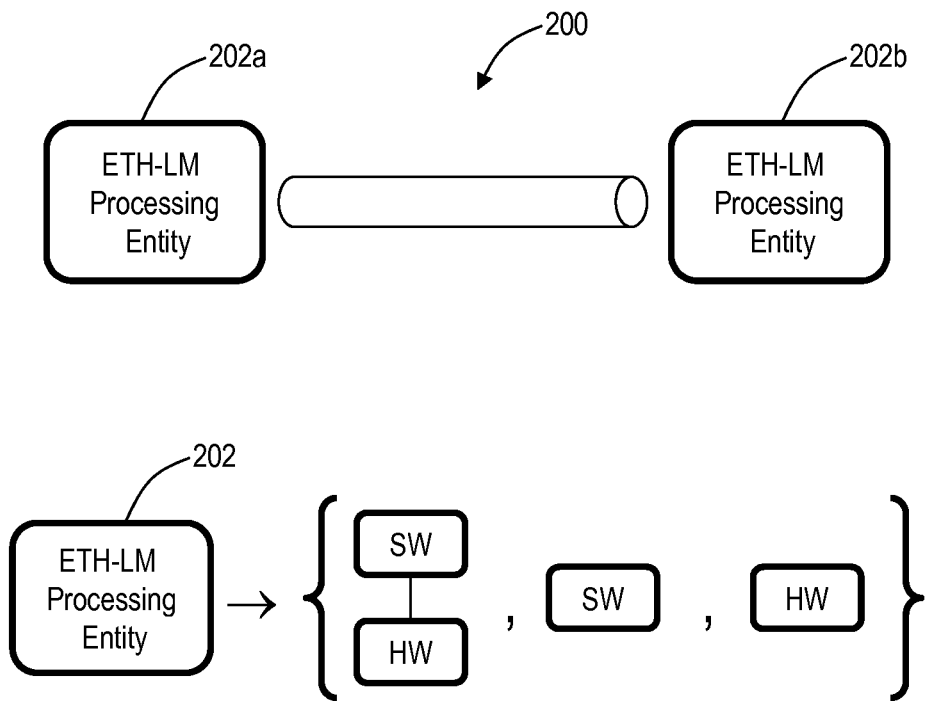
FIG. 2 is a block diagram of an Ethernet connection between two processing entities.

Referring to FIG. 2, in an exemplary embodiment, a block diagram illustrates an Ethernet connection 200 between two processing entities 202a, 202b. The processing entities 202 are configured to support OAM sessions on the Ethernet connection 200. The processing entities 202 can include software, a processor, hardware (e.g., Application Specific Integrated Circuit (ASIC), Field Programmable Gate Array (FPGA), etc. For example, the processing entities 202a, 202b can be located at the network elements 102, 104, respectively.

In an exemplary embodiment, the processing entities 202 include a combination of software operated on a processor and hardware interacting therebetween. In another exemplary embodiment, the processing entities 202 can include software operated on a processor. In yet another exemplary embodiment, the processing entities 202 can include hardware only. Variously, the processing entities 202 are configured to participate in the collection and calculation of OAM for the Ethernet connection 200 such as ETH-LM, ETH-DM, etc.

Figure 3:
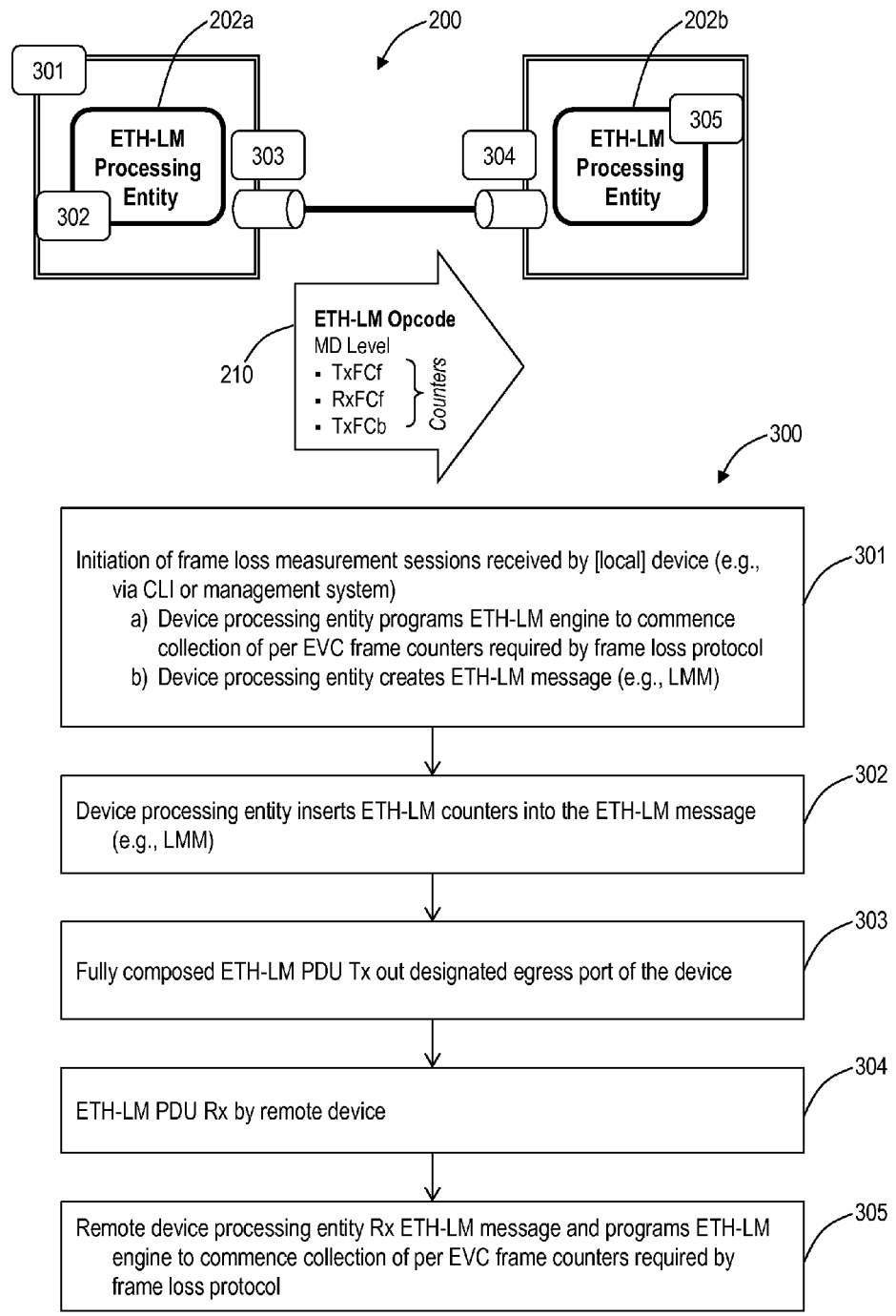
FIGS. 3-7 are a flowchart of an Ethernet OAM method between two processing entities.

Referring to FIGS. 3-7, in an exemplary embodiment, a flowchart illustrates an Ethernet OAM method 300. The method 300 can be implemented between the processing entities 202a, 202b on an Ethernet connection 200. In this exemplary embodiment, the processing entity 202a is the local MEP device and the processing entity 202b is the remote MEP device. Also, the method 300 is illustrated with reference to ETH-LM although other types of OAM are also contemplated herein. In FIG. 3, the method 300 begins with an initiation of frame loss measurement sessions being received by the local device (step 301). This can be through a command line interface, the management system 110, etc., and it serves as a request for the processing entity 202a to being an ETH-LM session with the processing entity 202b. The processing entity 202a includes an ETH-LM engine that is programmed to commence collection of per EVC frame counters required by frame loss protocol, and the processing entity 202a creates an ETH-LM message (e.g., LMM). The processing entity 202a inserts ETH-LM counters into the ETH-LM message (e.g., LMM) (step 302). A fully composed ETH-LM Protocol Data Unit PDU 210 is transmitted out the designated egress port of the device (step 303). The ETH-LM PDU 210 is a Carrier Ethernet frame with the OpCode set to ETH-LM (e.g., LMM OpCode=43), the appropriate MD level, and counters TxFCf, RxFCf, TxFCb included therein. In an exemplary embodiment, the counters can be included in the Type-Length-Value (TLV) fields of the ETH-LM PDU 210. The ETH-LM PDU 210 is received by the remote device (step 304). The remote device processing entity 202b receives the ETH-LM message and programs its ETH-LM engine to commence collection of per EVC frame counters required by frame loss protocol (step 305). Note, to ensure an orderly startup of the counters and eliminate the need to potentially discard the first measurement (as an exception in the processing entity ETH-LM engine), the remote device may not respond to the first received ETH-LM message, but respond to the subsequently received ETH-LM messages (with ETH-LM counters).

Figure 4:
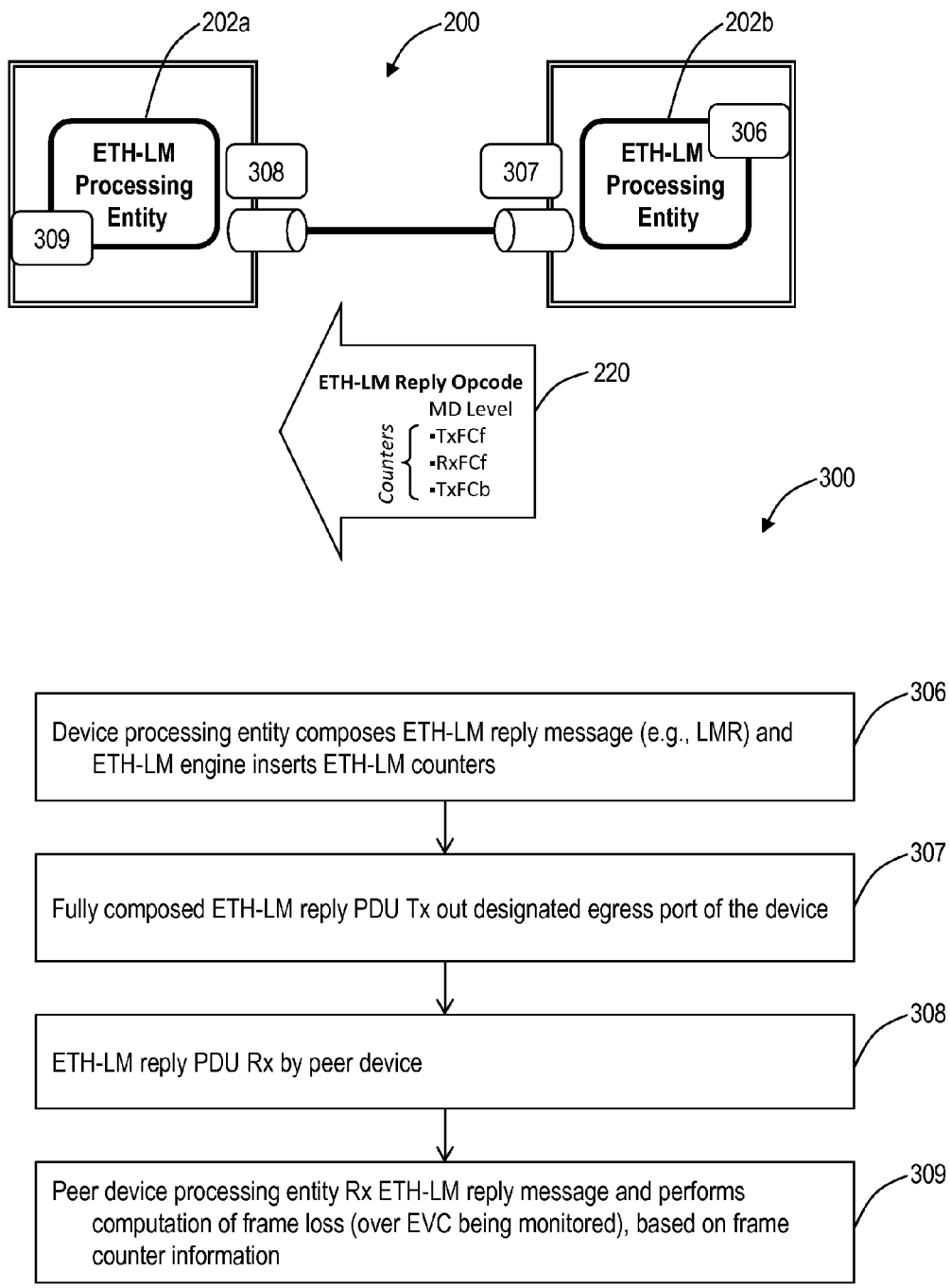
Figure 5:
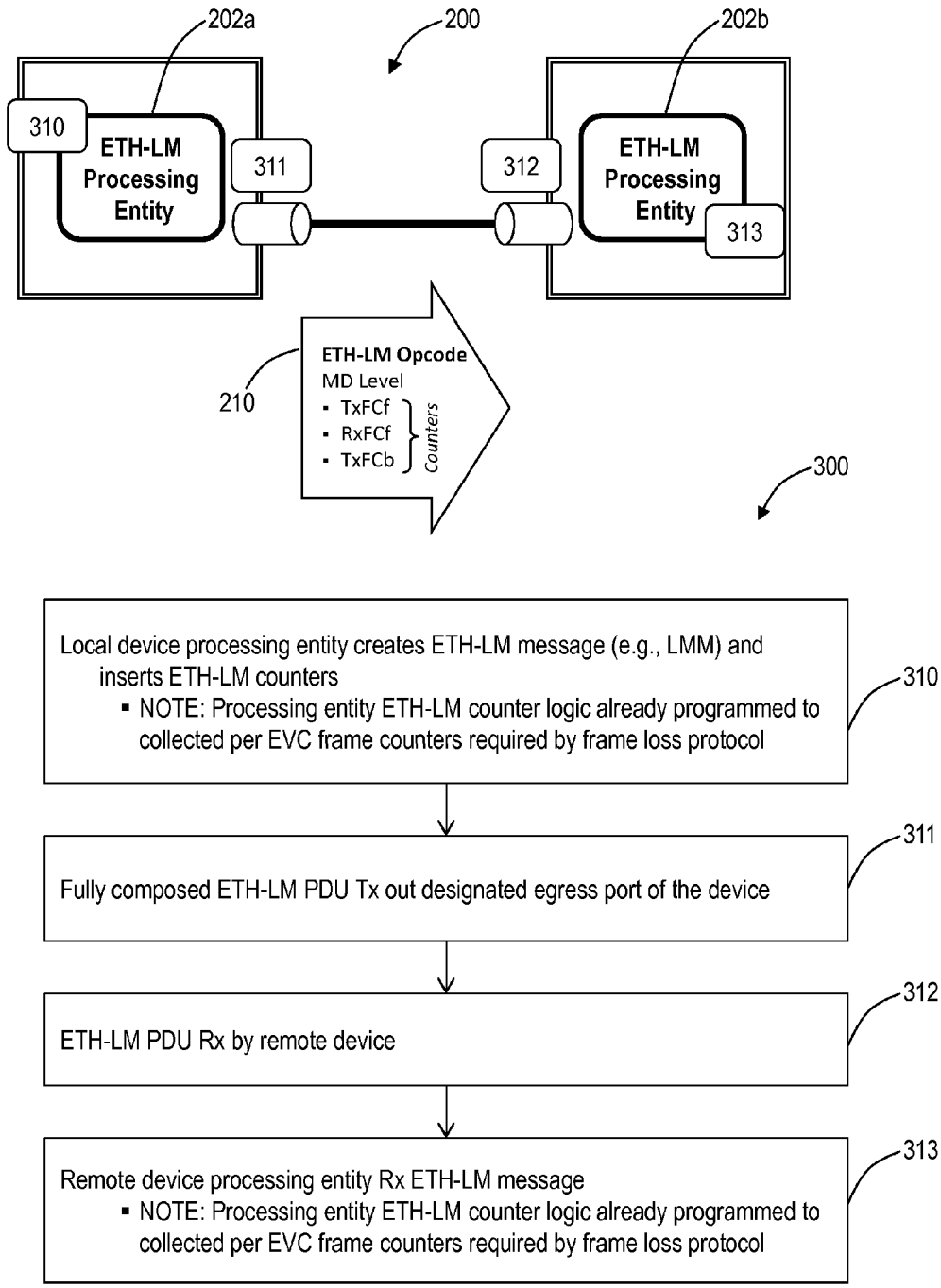

In FIG. 4, the processing entity 202b composes an ETH-LM reply message (e.g., LMR) and the ETH-LM engine inserts ETH-LM counters therein (step 306). A fully composed ETH-LM reply PDU 220 is transmitted out designated egress port of the device (step 307). The ETH-LM reply PDU 220 is a Carrier Ethernet frame with the OpCode set to ETH-LM (e.g., LMR OpCode=42), the appropriate MD level, and counters TxFCf, RxFCf, TxFCb included therein. In an exemplary embodiment, the counters can be included in the Type-Length-Value (TLV) fields of the ETH-LM reply PDU 220. The ETH-LM reply PDU 220 is received by the peer device (step 308). The peer device processing entity 202a receives the ETH-LM reply PDU 220 message and performs computation of frame loss (over EVC being monitored), based on frame counter information contained in the reply PDU 220 (step 309). In FIG. 5, the local device processing entity 202a creates the ETH-LM message 210 (e.g., LMM) and inserts ETH-LM counters (step 310). Note, the processing entity ETH-LM counter logic is already programmed to collect per EVC frame counters required by frame loss protocol. The fully composed ETH-LM PDU 210 is transmitted out designated egress port of the device (step 311). The ETH-LM PDU 210 is received by the remote device (step 312). The remote device processing entity 202b receives the ETH-LM message (step 313). Note, the processing entity ETH-LM counter logic is already programmed to collect per EVC frame counters required by frame loss protocol.

Figure 6:
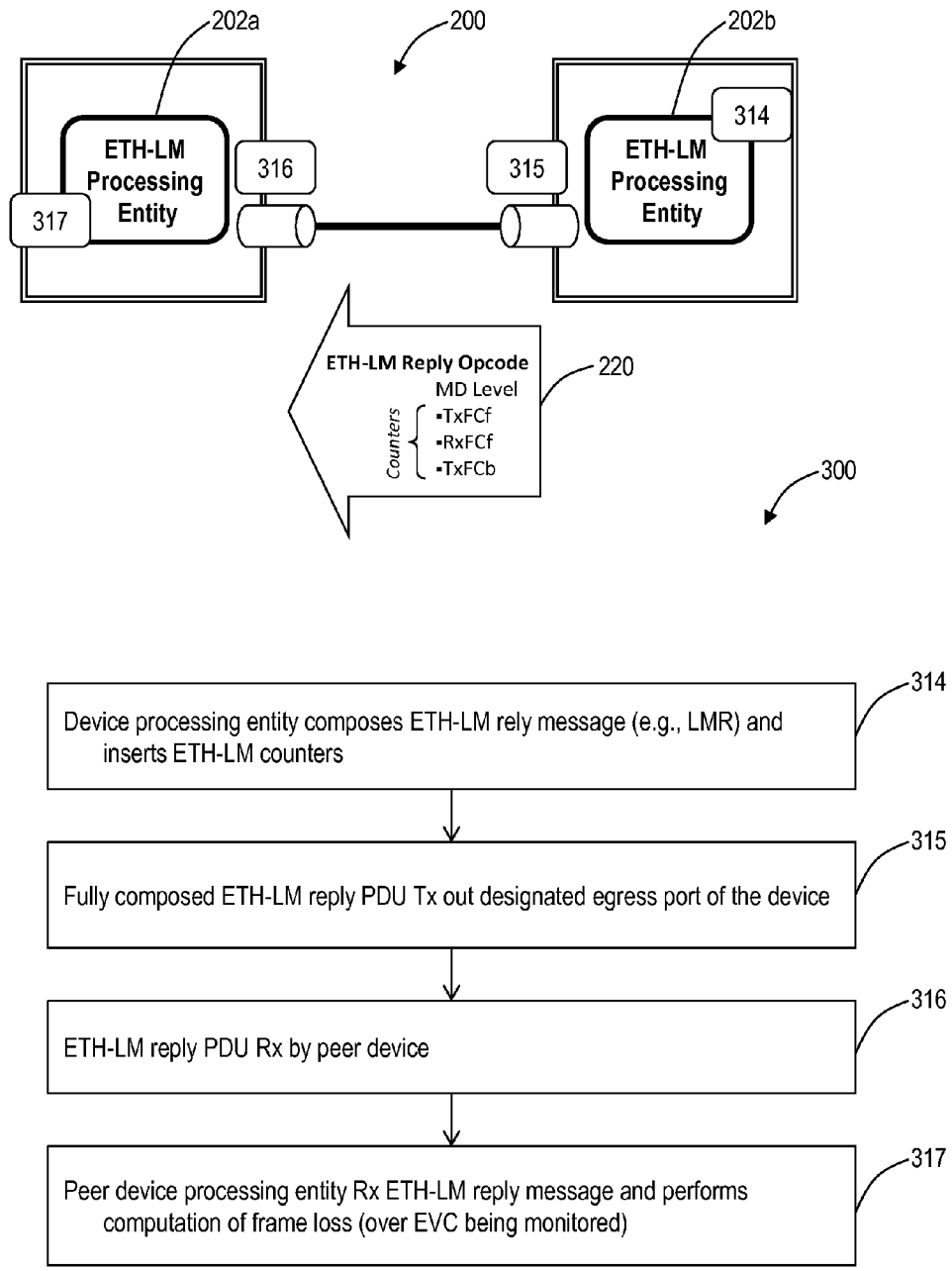
Figure 7:
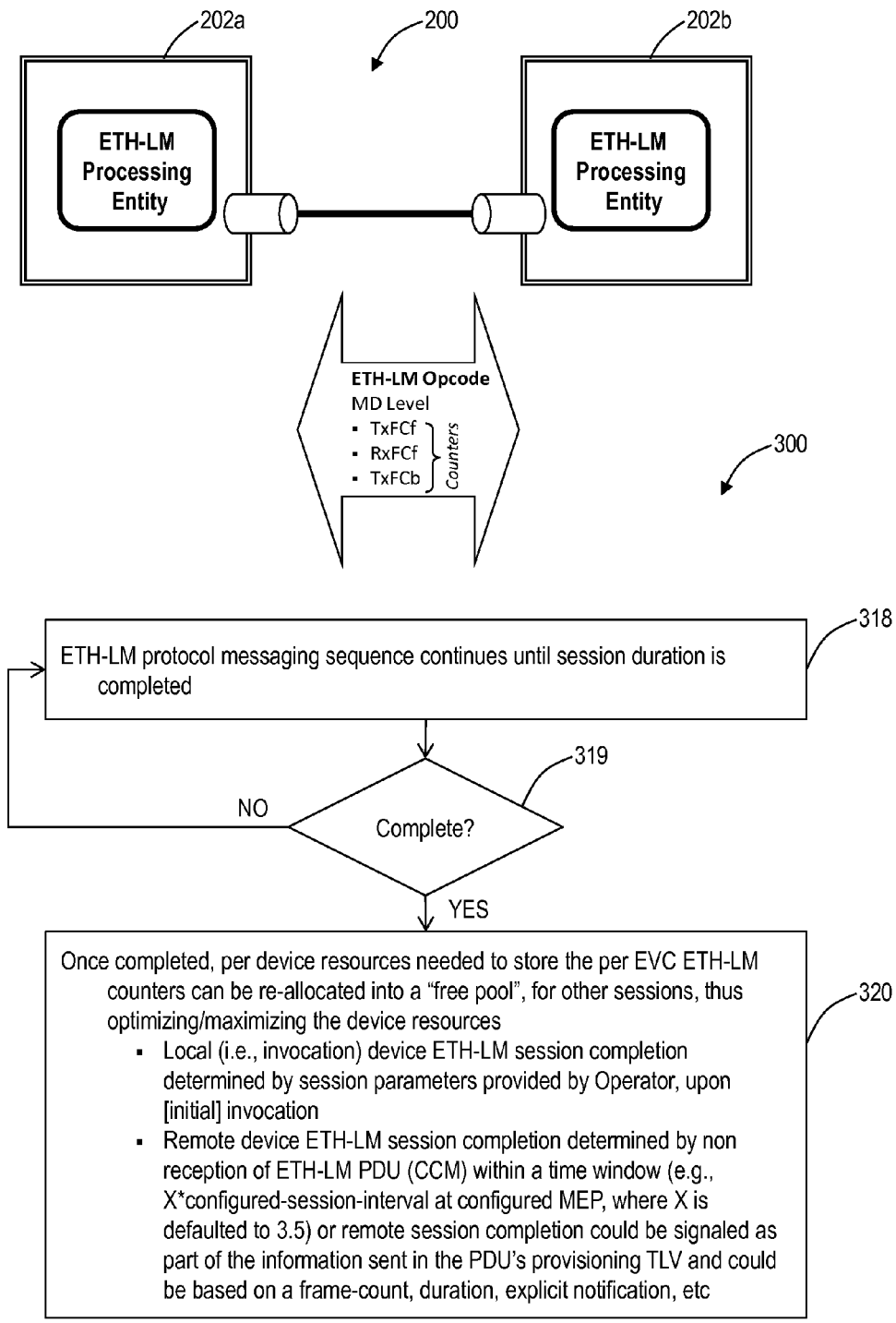

In FIG. 6, the device processing entity 202b composes an ETH-LM rely message 220 (e.g., LMR) and inserts ETH-LM counters therein (step 314). The fully composed ETH-LM reply PDU 220 is transmitted out the designated egress port of the device (step 315). The ETH-LM reply PDU 220 is received by the peer device (step 316). The peer device processing entity 202a receives the ETH-LM reply message 220 and performs computation of frame loss (over EVC being monitored) (step 317). In FIG. 7, the ETH-LM protocol messaging sequence continues until session duration is completed (step 318). Specifically, the processing entities 202a, 202b continue to exchange LMM and LMR PDUs with the counters contained therein. Once the session is completed (step 319), the per device resources needed to store the per EVC ETH-LM counters can be re-allocated into a "free pool", for other sessions, thus optimizing/maximizing the device resources (step 320). The local (i.e., invocation) device ETH-LM session completion determined by session parameters provided by the operator, upon initial invocation. The remote device ETH-LM session completion can be determined by non reception of ETH-LM PDU which are CCMs within a time window (e.g., X*configured-session-interval at configured MEP, where X is defaulted to 3.5). Also, the remote session completion could be signaled as part of the information sent in the PDU's provisioning TLV and could be based on a frame-count, duration, explicit notification, etc.

The method 300 was illustrated with respect to a single-ended ETH-LM session using LMM/LMR PDUs 210, 220. The method 300 can also be used in a dual-ended ETH-LM session using CCM PDUs with the ETH-LM counters contained therein such as in the TLV fields. Advantageously, the method 300 only requires the network operator to perform a management action on the local device, when initiating an ETH-LM session resulting in significant operational savings. Note, it is expected that the network 100 will include a plurality of Ethernet connections, and the method 300 enables OAM collection with a single touch point reducing the operational complexity by half (i.e., a single touch point versus two touch points). Also, the method 300 allows the data collection and storage requirements on the device (in support of the ETH-LM protocol) to be allocated only when the ETH-LM session is activated resulting in conservation of scarce resources on the network device.

Generally, the method 300 receives a request to initiate an Ethernet OAM session at the device 202a. That is, an operator, EMS, NMS, etc. can provide the request to the device 202a. The device 202a is configured to set up the OAM session responsive to the request. Instead of requiring the operator or the like to provide the request or other data to the remote device, the method 300 transmits a Protocol Data Unit (PDU) from the local device to the remote device with information related to the OAM session and the request contained therein. The remote device receives the PDU and in response thereto sets up the OAM session at the remote device based on the information in the PDU at the local device.

Figure 8A:
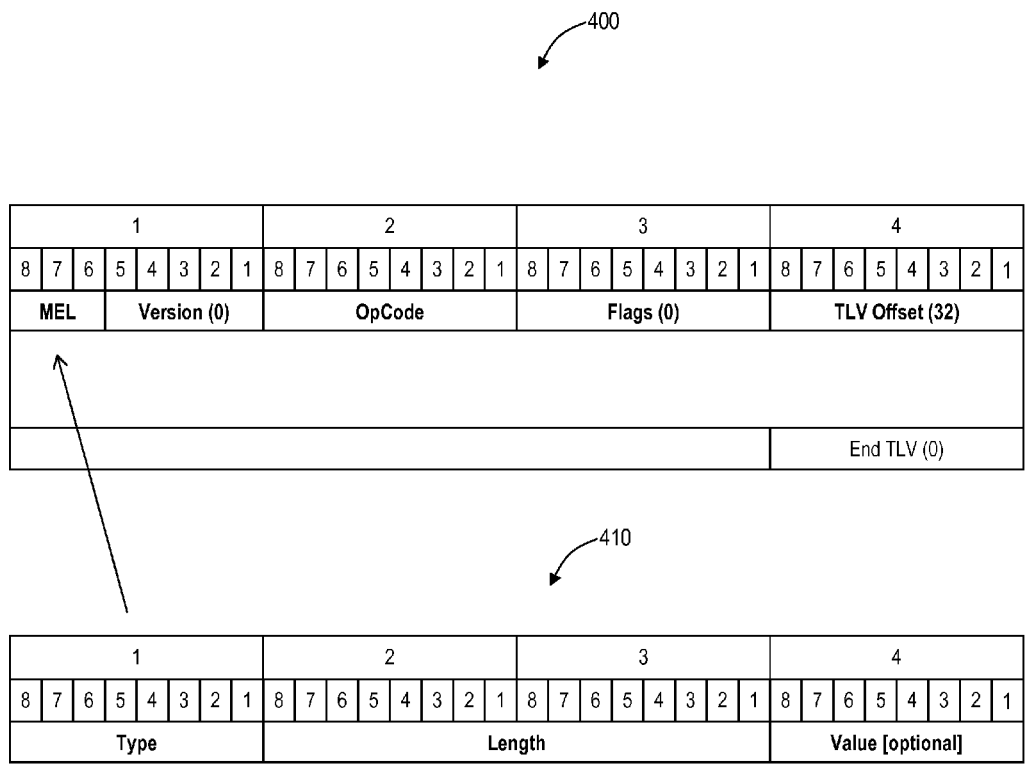
Figure 8B:
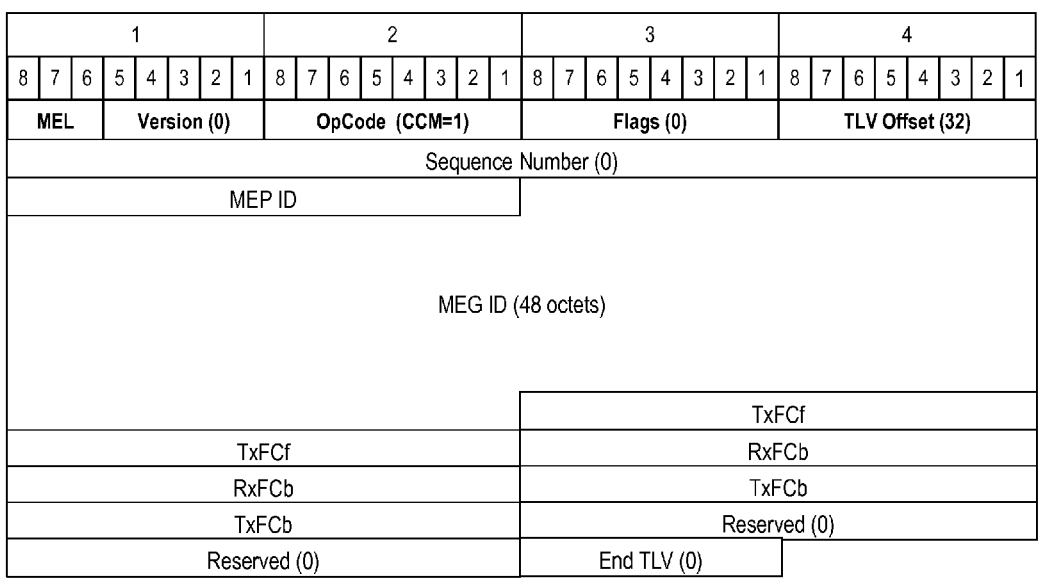

Referring to FIGS. 8A-8B, in an exemplary embodiment, block diagrams illustrate various Ethernet OAM PDUs 400 including a general PDU (FIG. 8A), a CCM (FIG. 8B), an LMM (FIG. 8C), and an LMR (FIG. 8D). The PDU 400 includes a MEG Level (MEL) which is an integer value that identifies MEG level of OAM PDU with value ranges from 0 to 7, a version field that contains an integer value that identifies the OAM protocol version, an OpCode identifying an OAM PDU type, a flag field that is used based on the OAM PDU type, and a TLV offset containing the offset to the first TLV in an OAM PDU relative to the TLV Offset field. The OpCode is used to identify the remaining content of an OAM PDU. For example, the PDU 400 can be a CCM (OpCode 1), a Loopback Message (LBM, OpCode 3), a Loopback Reply (OpCode 2), a Link Trace Message (LTM, OpCode 5), a Link Trace Reply (LTR, OpCode 4), an Alarm Indication Signal (AIS, OpCode 33), Locked (LCK, OpCode 35), a Test (TST, OpCode 37), a Maintenance Communication Channel (MCC, OpCode 41), LMM (OpCode 43), LMR (OpCode 42), a One-way Delay Measurement (1DM, OpCode 45), DMM (OpCode 47), DMR (OpCode 46), Experimental OAM Message (EXM, OpCode 49), Experimental OAM Reply (EXR, OpCode 48), Vendor-Specific OAM Message (VSM, OpCode 51), Vendor-Specific OAM Reply (VSR, OpCode 50), Client Signal Fail (CSF, OpCode 52), Synthetic Loss Message (SLM, OpCode 55), and Synthetic Loss Reply (SLR, OpCode 54).

The PDU 400 can include Type-Length-Value (TLV) 410 fields between the TLV Offset and the end TLV. The TLV 410 fields are used to encode information inside the PDU 400. The type field of the TLV 410 is a binary code which indicates the kind of field that this part of the message represents. The length field of the TLV 410 is the size of the value field, and the value field of the TLV 410 contains the data for this part of the message. In an exemplary embodiment, the systems and methods contemplate using the TLV 410 fields in the PDU 400 to convey information between the local and remote devices in lieu of requiring operator involvement on both devices. For example, the TLV 410 fields can be used to convey the session information in the method 300. Also, the counters can be conveyed using the CCMs, the LMMs, and/or the LMRs. Generally, the systems and methods contemplate using the TLV 410 fields for any CFM service that requires local and remote setup by software. In this regard, the TLV 410 fields enable the operator to avoid manual configuration of the remote device, i.e. elimination of a touch point. The TLV 410 fields convey any software provisioning such as duration, frequency, configuration data, etc. required from the local device to the remote device and back again. Variously, information for the systems and methods described herein can be conveyed in any entities or fields in the Ethernet PDUs. In an exemplary embodiment, information can be conveyed in TLVs, vendor-specific fields, undefined fields, reserved fields, etc. Note, the goal is to adhere to various standards with the information conveyed herein in a standards complaint manner. For example, the various methods described herein can utilize standards compliant CCMs, LMMs, and/or LMRs using the standard fields to exchange counter information and with additional TLV 410 fields providing provisioning instructions between local and remote devices.

As described herein, the ETH-LM is an exemplary operation of the systems and methods described herein. Assume an operator or an application calls for a frame loss measurement with information passed from CLI or the application including the remote MEP Destination Address (DA), Duration, Frequency, etc. The local device performs local configuration to establish the service, and then signals the remote MEP. In the systems and methods, the PDU 400 to the remote MEP includes information in the TLV fields 410 for setting up the remote MEP. Note, for ETH-LM, the PDU 400 can be either an LMM or a CCM. The session information passed in the TLV 410 can include duration, frequency, MEP Counter con-figuration, etc. The remote MEP is configured to automatically configure itself responsive to the data in the TLV 410. Thus, the ETH-LM service is activated with operator activity only at the local device. Now, the remote device is active, awaiting PDUs 400 from the local device for measurement. Upon receiving PDUs 400 from the local device, the remote device can send responses also with information provided in the TLV 410. The responses can be LMRs or CCMs, and the TLV 410 can include any information of relevance to the local device such as counter values, provisioning instructions, etc. During the pendency of the ETH-LM session, the MEPs can use the TLV 410 to exchange information in LMMs, LMRs, and/or CCMs. From this, the local device can verify TX LMM count against RX LMR counters and calculate frame loss.

Figure 9:
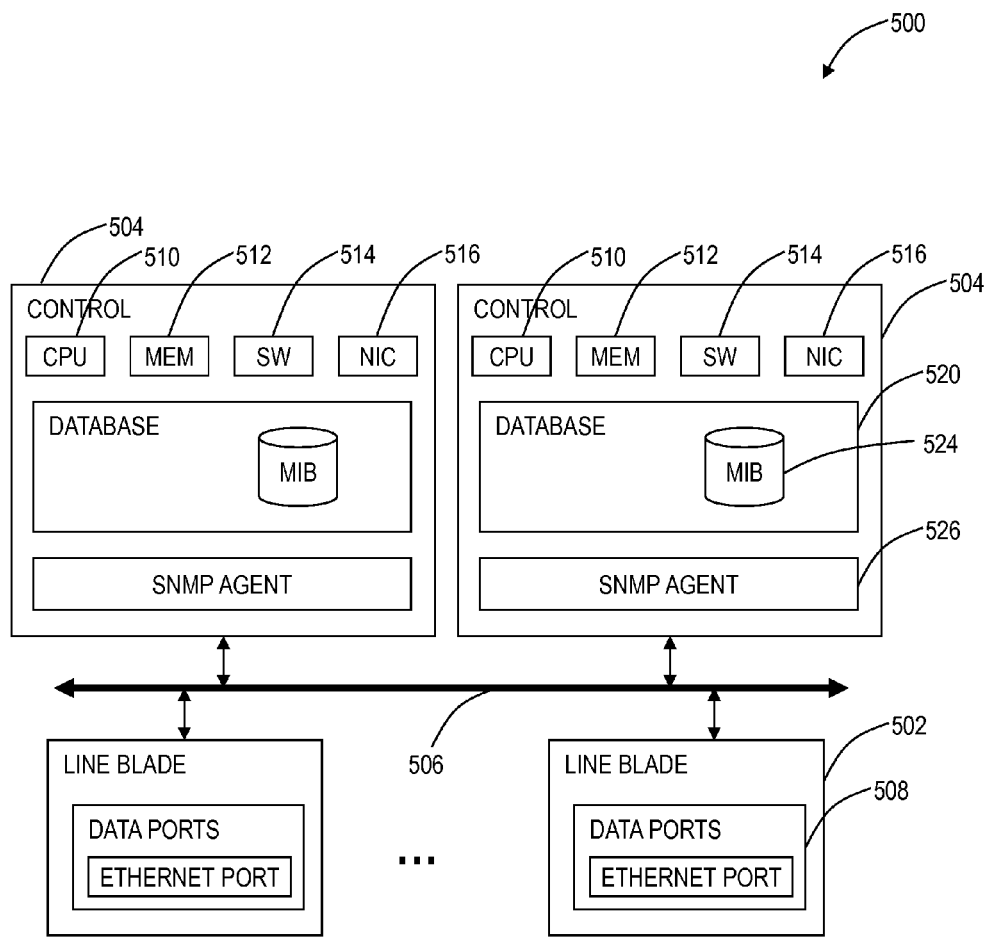
FIG. 9 is a block diagram of an exemplary implementation of a network element.

Referring to FIG. 9, in an exemplary embodiment, a block diagram illustrates an exemplary implementation of a network element 500 such as for the MEP 102, 104 and/or the MIP 106 in the network 100. In this exemplary embodiment, the network element 500 is an Ethernet network switch for illustration purposes, but those of ordinary skill in the art will recognize the Carrier Ethernet systems and methods described herein contemplate other types of network elements and other implementations providing dynamic Ethernet OAM systems and methods. In this exemplary embodiment, the network element 500 includes a plurality of blades 502, 504 interconnected via an interface 506. The blades 502, 504 are also known as line cards, line modules, circuit packs, pluggable modules, etc. and refer generally to components mounted within a chassis, shelf, etc. of a data switching device, i.e. the network element 500. Each of the blades 502, 504 may include numerous electronic devices and/or optical devices mounted on a circuit board along with various interconnects including interfaces to the chassis, shelf, etc. Two exemplary blades are illustrated with line blades 502 and control blades 504. The line blades 502 generally include data ports 508 such as a plurality of Ethernet ports. For example, the line blade 502 may include a plurality of physical ports disposed on an exterior of the blade 502 for receiving ingress/egress connections. Exemplary port types may include, but not limited to, GbE, 10 GbE, 40 GbE, 100 GbE, Ethernet over SONET/SDH (2.5 G, 10 G, 40 G, etc.), Ethernet over Optical Transport Network (OTU2, OTU3, OTU4, etc.), and the like.

Additionally, the line blades 502 may include switching components to form a switching fabric via the interface 506 between all of the data ports 508 allowing data traffic to be switched between the data ports 508 on the various line blades 502. The switching fabric is a combination of hardware, software, firmware, etc. that moves data coming into the network element 500 out by the correct port 508 to the next network element. In general, the switching fabric may include switching units, or individual boxes, in a node; integrated circuits contained in the switching units; and programming that allows switching paths to be controlled. The control blades 504 include a microprocessor 510, memory 512, software 514, and a network interface 516. Specifically, the microprocessor 510, the memory 512, and the software 514 may collectively control, configure, provision, monitor, etc. the network element 500. The network interface 516 may be utilized to communicate with a management system such as the management system 110 and the like. Additionally, the control blades 504 may include a database 520 that tracks and maintains provisioning, configuration, operational data and the like. The database 520 may include a management information base (MIB) 522 which may include CFM objects. Further, the control blades 504 may include an Simple Network Management Protocol (SNMP) Agent 524 configured to operate SNMPv2, SNMPv3, etc. or some other network management communication protocol. In this exemplary embodiment, the network element 500 includes two control blades 504 which may operate in a redundant or protected configuration such as 1:1, 1+1, etc. In general, the control blades 504 maintain dynamic system information including Layer two forwarding databases, protocol state machines, and the operational status of the ports 508 within the network element 500. Additionally, the control blades 504 and/or the line blades 502 can be configured to operate as the processing entities 202 described herein.

Of note, the foregoing description is directed to an Ethernet OAM ETH-LM protocol, but those of ordinary skill in the art will recognize the systems and methods described herein can be applied to other protocols such as Multiprotocol Label Switching (MPLS) Transport Profile (MPLS-TP). For example, in Ethernet OAM (e.g., Y.1731 ETH-LM), a first PDU from the local device to the remote device can be an LMM PDU and a second PDU from the remote device to the local device can be an LMR PDU. In the context of MPLS-TP, the, first and second would refer to the specific MPLS-TP PDU type.

It will be appreciated that some exemplary embodiments described herein may include one or more generic or specialized processors ("one or more processors") such as microprocessors, digital signal processors, customized processors, and field programmable gate arrays (FPGAs) and unique stored program instructions (including both software and firmware) that control the one or more processors to implement, in conjunction with certain non-processor circuits, some, most, or all of the functions of the methods and/or systems described herein. Alternatively, some or all functions may be implemented by a state machine that has no stored program instructions, or in one or more application specific integrated circuits (ASICs), in which each function or some combinations of certain of the functions are implemented as custom logic. Of course, a combination of the aforementioned approaches may be used. Moreover, some exemplary embodiments may be implemented as a non-transitory computer-readable storage medium having computer readable code stored thereon for programming a computer, server, appliance, device, etc. each of which may include a processor to perform methods as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer readable medium, software can include instructions executable by a processor that, in response to such execution, cause a processor or any other circuitry to perform a set of operations, steps, methods, processes, algorithms, etc.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure and are intended to be covered by the following claims.

What is claimed is:

1. An Ethernet method, comprising:
   receiving a request to initiate an Ethernet Operations, Administration, and Maintenance (OAM) session for Ethernet Frame Loss Measurement at a local device;
   setting up the OAM session at the local device responsive to the request;
   transmitting a Protocol Data Unit (PDU) from the local device to a remote device with information related to the OAM session and the request; and
   receiving the PDU at the remote device and in response setting up a corresponding OAM session at the remote device based on the information in the PDU, wherein the remote device is triggered to perform local counter measurements for the Ethernet Frame Loss Measurement based on the information in the PDU, and wherein the PDU comprises a first measurement from the local device to the remote device that is discarded by the remote device for measurement purposes since it is used to set up the corresponding OAM session;
   initiating the OAM session and the corresponding OAM session through one of an operator issued command and an application only at the local device without requiring operator involvement at the remote device, wherein local counter measurement data from both the local device and the remote device is obtained without requiring operator involvement at the remote device to set up the corresponding OAM session;
   collecting frame counters at each of the local device and the remote device only while the OAM session is active;
   exchanging information comprising the frame counters between the local device and the remote device in counter fields in one of a Continuity Check Message (CCM), a Loss Measurement Message (LMM), and Loss Measurement Reply (LMR) and exchanging provisioning information related to duration, frequency, and configuration data in at least one Type-Length-Value (TLV) field of the PDU, wherein the Ethernet Frame Loss Measurement is single-ended, wherein the PDU comprises a LMM with local frame counter data contained therein;
   receiving the LMM at the remote device and programming an Ethernet Frame Loss Measurement engine to commence collection of per frame counters from the local device and composing a LMR to the local device and providing data from the collection in the LMR; and
   receiving the LMR at the local device and computing frame loss based on the data from the collection in the LMR.

2. The Ethernet method of claim 1, wherein the information related to the OAM session is located in counter fields in one of a Continuity Check Message (CCM), a Loss Measurement Message (LMM), and Loss Measurement Reply (LMR), and wherein provisioning information for the remote device is contained in at least one Type-Length-Value (TLV) field of the PDU.

3. The Ethernet method of claim 1, wherein the PDU comprises a first PDU, and the method further comprising:
   collecting remote frame counters for the OAM session at the remote device; and
   transmitting a second PDU from the remote device to the local device with data related to the remote frame counters contained therein.

4. The Ethernet method of claim 3, further comprising:
   receiving the second PDU at the local device; and
   performing a computation for the OAM session based on the data related to the remote frame counters contained.

5. The Ethernet method of claim 3, wherein the provisioning information related to the OAM session is located in at least one Type-Length-Value (TLV) field of the first PDU and the data related to the remote frame counters is located in counter fields of the second PDU.

6. The Ethernet method of claim 1, further comprising:
transmitting PDUs between the local device and the remote device;
collecting remote frame counters for the OAM session at the remote device; and
exchanging information between the local device and the remote device in Type-Length-Value (TLV) fields of the PDUs for setting up a measurement associated with the OAM session.

7. The Ethernet method of claim 6, further comprising:
upon termination of the OAM session, stopping the collecting remote frame counters at the remote device and stopping collecting local frame counters at the local device.

8. The Ethernet method of claim 7, further comprising:
terminating the OAM session at the local device based on session parameters provided during the initiating; and
terminating the OAM session at the remote device based on non-reception of PDUs associated with the OAM session during a time window.

9. The Ethernet method of claim 1, wherein the Ethernet Frame Loss Measurement is dual-ended, wherein the PDU comprises a first Continuity Check Message (CCM) with local frame counter data contained therein, and the method further comprising:
receiving the first CCM at the remote device and programming an Ethernet Frame Loss Measurement engine to commence collection of per frame counters from the local device;
composing a second CCM to the local device and providing data from the collection in the second CCM; and
receiving the second CCM at the local device and computing frame loss based on the data from the collection in the second CCM.

10. The Ethernet method of claim 1, further comprising:
utilizing at least one Type-Length-Value (TLV) field of the PDU to exchange data between the local device and the remote device for any Connectivity Fault Management service that requires setup at both the local device and the remote device thereby avoiding the setup at the remote device.

11. An Ethernet node, comprising:
at least one port communicatively coupled to a remote device;
a processing entity associated with an Ethernet connection on the at least one port, wherein the processing entity comprises instructions that, when executed, cause the processing entity to:
initiate an Ethernet Frame Loss Measurement session at the Ethernet node;
set up the Ethernet Frame Loss Measurement session through collecting local frame counters;
transmit a Protocol Data Unit (PDU) to the remote device with information related to the Ethernet Frame Loss Measurement session, wherein the PDU contains a measurement by the Ethernet node and instructions to cause the remote device to establish a corresponding Ethernet Frame Loss Measurement session, and wherein the remote device is configured to discard the PDU for measurement purposes since it is used to set up the corresponding Ethernet Frame Loss Measurement session;
receive a response PDU from the remote device with information related to the corresponding Ethernet Frame Loss Measurement session at the remote device;
calculate Ethernet Frame Loss based on the response PDU;
collect frame counters at the Ethernet node only while the OAM session is active;
exchange information comprising the frame counters between the Ethernet node and the remote device in counter fields in one of a Continuity Check Message (CCM), a Loss Measurement Message (LMM), and Loss Measurement Reply (LMR); and
exchange provisioning information related to duration, frequency, and configuration data in at least one Type-Length-Value (TLV) field of the PDU, wherein the Ethernet Frame Loss Measurement is single-ended, wherein the PDU comprises a LMM with local frame counter data contained therein, wherein the remote device is configured to receive the LMM and program an Ethernet Frame Loss Measurement engine to commence collection of per frame counters from the Ethernet node and compose a LMR to the Ethernet node to provide data from the collection in the LMR; and
receive the LMR at the Ethernet node and compute frame loss based on the data from the collection in the LMR;
wherein the Ethernet Frame Loss Measurement session and the corresponding Ethernet Frame Loss Measurement session are initiated through one of an operator issued command and an application only at the Ethernet node without requiring operator involvement at the remote device, wherein local frame counter data from both the Ethernet node and the remote device is obtained without requiring operator involvement at the remote device to set up the corresponding Ethernet Frame Loss Measurement session.

12. The Ethernet node of claim 11, wherein the PDU and the response PDU utilize at least one Type-Length-Value (TLV) field to exchange provisioning information between the Ethernet node and the remote device for any Connectivity Fault Management service that requires setup at both the Ethernet node and the remote device thereby avoiding the setup at the remote device.

13. A network, comprising:
a plurality of interconnected nodes;
a local processing entity at a local node of the plurality of interconnected nodes, wherein the local processing entity comprises instructions that, when executed, cause the local processing entity to:
initiate a Frame Loss Measurement session at the local node;
set up the Frame Loss Measurement session through collecting local frame counters;
transmit a Protocol Data Unit (PDU) to a remote node with information related to the Frame Loss Measurement session, wherein the PDU contains a measurement by the local node and instructions to cause the remote node to establish a corresponding Ethernet Frame Loss Measurement session;
receive a response PDU from the remote node with information related to the corresponding Frame Loss Measurement session at the remote node; and
calculate Frame Loss based on the response PDU;
wherein the Frame Loss Measurement session and the corresponding Frame Loss Measurement session are initiated through one of an operator issued command and an application only at the local node without requiring operator involvement at the remote node, wherein local frame counter data from both the local node and the remote node is obtained without requiring operator involvement at the remote node to set up the corresponding Frame Loss Measurement session; and a remote processing entity at the remote node of the plurality of interconnected nodes, wherein remote local processing entity comprises instructions that, when executed, cause the remote processing entity to:

receive the PDU and set up the corresponding Frame Loss Measurement session through collecting remote frame counters and discard the PDU or measurement purposes since it is used to set up the corresponding Ethernet Frame Loss Measurement session; and transmit the response PDU with the information related to the corresponding Frame Loss Measurement session at the remote node based on the remote frame counters, wherein the local processing entity and the remote processing entity only collect frame counters while the OAM session is active, wherein the local processing entity and the remote processing entity are configured to exchange information comprising the frame counters in counter fields in one of a Continuity Check Message (CCM), a Loss Measurement Message (LMM), and Loss Measurement Reply (LMR) and exchange provisioning information related to duration, frequency, and configuration data in at least one Type-Length-Value (TLV) field of the PDU, wherein the Ethernet Frame Loss Measurement is single-ended, wherein the PDU comprises a LMM with local frame counter data contained therein, wherein the remote processing entity is configured to receive the LMM and program an Ethernet Frame Loss Measurement engine to commence collection of per frame counters from the local processing entity and compose a LMR to the local processing entity to provide data from the collection in the LMR, and wherein the local processing entity is configured to receive the LMR and compute frame loss based on the data from the collection in the LMR.

14. The network of claim 13, wherein the Frame Loss Measurement comprises one of an Ethernet Frame Loss Measurement and a Multiprotocol Label Switching-Transport Profile Frame Loss Measurement.

\* \* \* \* \*